US009325882B2

(12) United States Patent
Kato

(10) Patent No.: US 9,325,882 B2
(45) Date of Patent: Apr. 26, 2016

(54) IMAGE PICKUP APPARATUS CONFIGURED TO BE CAPABLE OF PREVENTING DISCONNECTION OF CONNECTORS

(71) Applicant: CANON KABUSHIKI KAISHA, Tokyo (JP)

(72) Inventor: Shuichi Kato, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 214 days.

(21) Appl. No.: 13/682,807

(22) Filed: Nov. 21, 2012

(65) Prior Publication Data
US 2013/0141636 A1      Jun. 6, 2013

(30) Foreign Application Priority Data

Nov. 25, 2011   (JP) ................................. 2011-257454
Nov. 13, 2012   (JP) ................................. 2012-249428

(51) Int. Cl.
 *H04N 5/225*       (2006.01)
 *H04M 1/02*        (2006.01)
 *G06K 9/20*        (2006.01)

(52) U.S. Cl.
 CPC ........... *H04N 5/2252* (2013.01); *H04N 5/2253* (2013.01); *G03B 2217/002* (2013.01); *G06K 9/209* (2013.01); *H04M 1/0264* (2013.01)

(58) Field of Classification Search
 None
 See application file for complete search history.

(56) References Cited

U.S. PATENT DOCUMENTS

| 5,273,446 | A | * | 12/1993 | Walkup .......................... 439/153 |
| 5,872,333 | A | * | 2/1999 | Uezono et al. ................... 174/55 |
| 8,106,952 | B2 | * | 1/2012 | Yoshida et al. ........... 348/208.99 |
| 8,693,205 | B2 | * | 4/2014 | Moser et al. ................... 361/752 |
| 2004/0169771 | A1 | * | 9/2004 | Washington et al. .......... 348/374 |
| 2009/0237537 | A1 | * | 9/2009 | Maruyama et al. ........... 348/294 |
| 2009/0266606 | A1 | * | 10/2009 | Kameyama .......... H04N 5/2252 174/521 |
| 2009/0322149 | A1 | * | 12/2009 | Kishibata ...................... 307/10.1 |
| 2011/0199485 | A1 | * | 8/2011 | Nakamura ............ G02B 13/001 348/148 |
| 2011/0255250 | A1 | * | 10/2011 | Dinh et al. ..................... 361/749 |

FOREIGN PATENT DOCUMENTS

JP       2006-339206 A      12/2006

* cited by examiner

*Primary Examiner* — Roberto Velez
*Assistant Examiner* — Quan Pham
(74) *Attorney, Agent, or Firm* — Rossi, Kimms & McDowell LLP

(57) ABSTRACT

An image pickup apparatus which is capable of preventing disconnection of connectors for a circuit substrate, on which an image pickup device is mounted, without making optical adjustment difficult. A fixing member is fixed to the image pickup device. One end of a flexible substrate is connected to the circuit substrate via a connector connecting portion. A protective member is fixed to the fixing member so as to cover the connector connecting portion.

4 Claims, 12 Drawing Sheets

IMAGE PICKUP APPARATUS CONFIGURED TO BE CAPABLE OF PREVENTING DISCONNECTION OF CONNECTORS

BACKGROUND OF THE INVENTION

1. Field of the Invention

The present invention relates to an image pickup apparatus such as a digital camera or a video camera.

2. Description of the Related Art

Conventionally, image pickup apparatuses as typified by digital cameras have been required to be equipped with a large image pickup device due to the demand for higher image quality. Upsizing an image pickup device gains various benefits such as reduced noise resulting in improved tone, enlarged dynamic range, and increased range of depth of field, but on the other hand, an image pickup apparatus has to be upsized.

In particular, upsizing of an image pickup substrate which is a circuit substrate on which an image pickup device is mounted is inevitable. The position of an image pickup substrate as well as the position of an image pickup device is adjusted during optical adjustment carried out when the image pickup apparatus is assembled, and for this reason, the image pickup substrate is preferably configured to be as small as possible. Accordingly, an image pickup substrate is generally configured separately from a main substrate which is a circuit substrate on which electronic components are mounted.

Further, there is known a technique that an image pickup substrate itself is comprised of a flexible substrate which is flexible so that the image pickup substrate and a main substrate can be electrically connected together. The image pickup substrate and the main substrate are electrically connected together by a connector mounted on one or both of the image pickup substrate and the main substrate. In this case, the image pickup substrate is a multilayer flexible substrate, and further, as described above, because the image pickup substrate becomes larger with upsizing of the image pickup device, the image pickup substrate should be very expensive.

There is known another technique that electrically connects an image pickup substrate and a main substrate together by a flexible substrate or a wire harness for connection (hereafter referred to as the connecting member). Although the image pickup substrate has a multilayer construction, it is not expensive because the image pickup substrate itself does not have to be comprised of a flexible substrate, and the size of the image pickup substrate can be minimized. Moreover, even when the connecting member is formed of a flexible substrate, it does not have to be a multilayer one and therefore be inexpensive.

The configuration using the connecting member requires electrical connection using connectors or the like in two places such as the image pickup substrate and the connecting member, and the connecting member and the main substrate. Moreover, for connecting areas using connectors, it is important to take a preventive measure for preventing disengagement of the connectors due to a shock caused by a drop of the image pickup apparatus. As this preventive measure, there has been known a method that, for example, when connectors are of a vertical fitting type, provides an outer cover or the like with a restraining member and elastically urges a connector connecting portion so as to inhibit the distance between the connectors from becoming longer than an effective fitting length of the connector connecting portion (Japanese Laid-Open Patent Publication (Kokai) No. 2006-339206).

Among two connecting areas including a connecting area between the image pickup substrate and the connecting member, and a connecting area between the connecting member and the main substrate as described above, the method as described in Japanese Laid-Open Patent Publication (Kokai) No. 2006-339206 can be effectively applied to the latter. However, it is difficult to apply the same configuration to a connecting area where the image pickup substrate and the connecting member are connected together.

This is because the position of an image pickup substrate is adjusted during optical adjustment as described above, and hence when an outer cover or the like is provided with a restraining member, the distance between the image pickup substrate and the outer cover is not constant, and also, the distance between the restraining member and a connector connecting portion mounted on the image pickup substrate is not constant. For this reason, not only the effect of reliably preventing disconnection of the connector connecting portion cannot be expected, but also the image pickup substrate that has already been optically adjusted may be out of position due to an unexpected load imposed thereon, and as a result, optical adjustment may be difficult.

SUMMARY OF THE INVENTION

The present invention provides an image pickup apparatus which is capable of preventing disconnection of connectors for a circuit substrate, on which an image pickup device is mounted, without making optical adjustment difficult.

Accordingly, a first aspect of the present invention provides an image pickup apparatus comprising an image pickup device, a circuit substrate configured to have the image pickup device mounted thereon, a fixing member configured to be fixed to the image pickup device, a flexible substrate configured to be connected to the circuit substrate via a connector connecting portion, and a protective member configured to be attached to the fixing member so as to cover the connector connecting portion.

Accordingly, a second aspect of the present invention provides an image pickup apparatus comprising an image pickup device, a circuit substrate configured to have the image pickup device mounted thereon, a fixing member configured to be fixed to the image pickup device, and a flexible substrate configured to be connected to the circuit substrate via a connector connecting portion, wherein a restraining portion for preventing disconnection of the connector connecting portion is formed integrally with the fixing member, and the restraining portion is extended from one end of the fixing member and bent so as to face a rear surface of the fixing member.

According to the present invention, disconnection of connectors for a circuit substrate, on which an image pickup device is mounted, can be prevented without making optical adjustment difficult.

Further features of the present invention will become apparent from the following description of exemplary embodiments (with reference to the attached drawings).

BRIEF DESCRIPTION OF THE DRAWINGS

FIGS. 1A and 1B are views showing an appearance of an image pickup apparatus according to a first embodiment, in which FIG. 1A is a front perspective view, and FIG. 1B is a rear perspective view.

FIGS. 3A and 3B are views showing an area where an image pickup device and a fixing member according to the first embodiment are fixed together, in which FIG. 3A is a front perspective view, and FIG. 3B is a rear perspective view.

FIGS. 5A and 5B are views useful in explaining a case where a flip-type connector is used as a connector connecting portion, in which FIG. 5A is a horizontal cross-sectional view, and FIG. 5B is an enlarged view showing the connector connecting portion.

FIGS. 6A and 6B are views showing an image pickup apparatus according to a second embodiment, in which FIG. 6A is a rear perspective view showing an area where a fixing member and a protective member are fixed together, and FIG. 6B is a horizontal cross-sectional view showing this area.

FIGS. 9A to 9F are views showing steps in which an image pickup device and an image pickup substrate and a fixing member according to the third embodiment are joined together, in which FIGS. 9A, 9C, and 9E are front perspective views showing, in chronological order, how a joined unit of the image pickup substrate and a flexible substrate is inserted into the fixing member, and FIGS. 9B, 9D, and 9F are rear perspective views showing, in chronological order, how the joined unit of the image pickup substrate and the flexible substrate is inserted into the fixing member.

FIGS. 10A to 10C are views showing how the image pickup device and the image pickup substrate and the fixing member according to the third embodiment are fixed together, in which FIG. 10A is a side view, FIG. 10B is a horizontal cross-sectional view, and FIG. 10C is an enlarged horizontal cross-sectional view showing connectors and their vicinity.

DESCRIPTION OF THE EMBODIMENTS

The present invention will now be described in detail with reference to the drawings showing embodiments thereof.

Figure 1A:
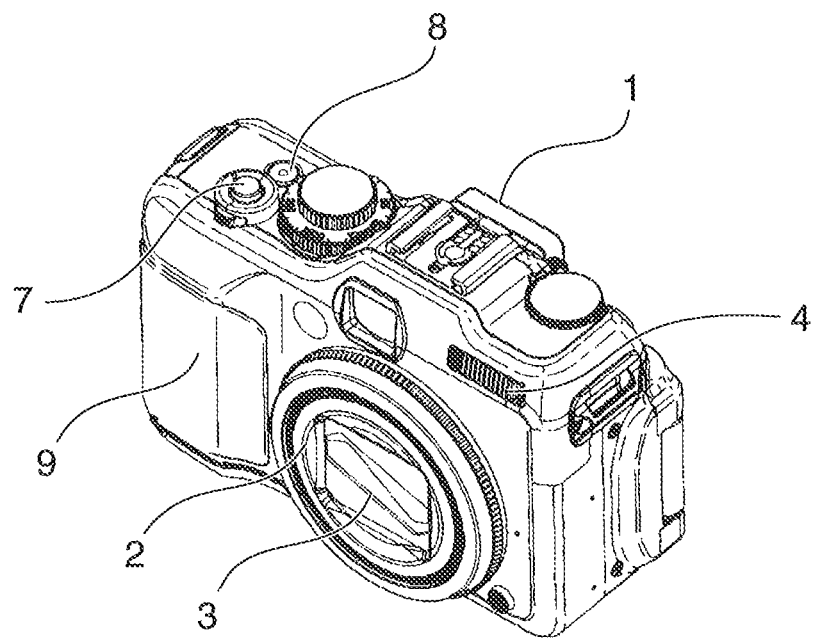
Figure 1B:
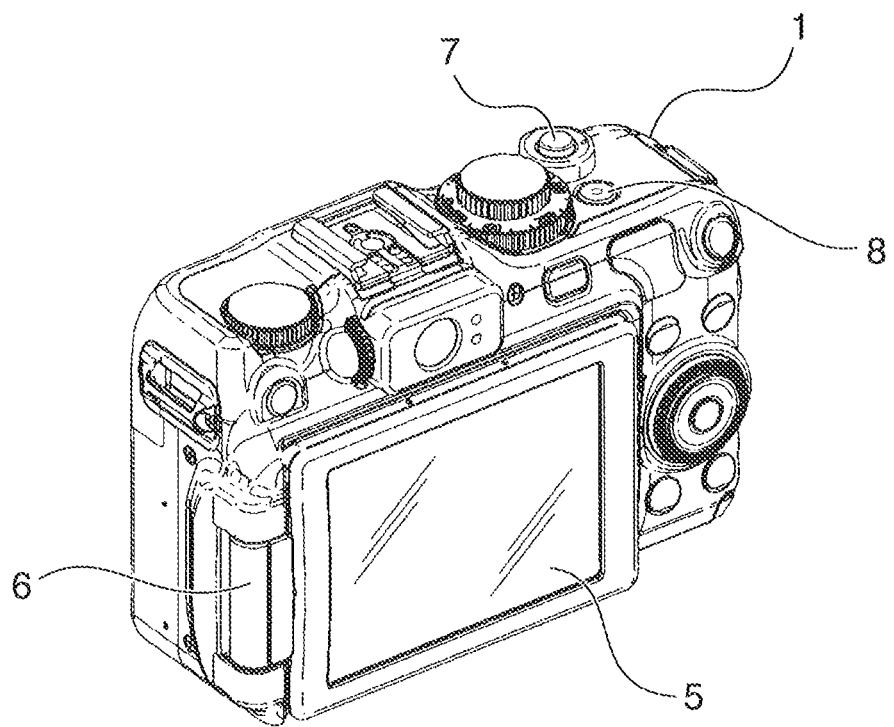

FIGS. 1A and 1B are a front perspective view and a rear perspective view, respectively, showing an appearance of an image pickup apparatus according to a first embodiment of the present invention. In the present embodiment described hereafter, a digital camera is used as an exemplary image pickup apparatus. However, the present invention may be applied to other image pickup apparatuses such as a video camera.

A camera main body 1 of the digital camera has a lens unit 2 that holds a taking lens and is able to move forward and backward parallel to a direction of an optical axis of the taking lens (a longitudinal direction of the camera) with respect to the camera main body 1. When the camera is carried, when the camera is not in use, or when only an operation to reproduce a taken image is performed, the lens unit 2 is retracted at such a position as not to project out from the camera main body 1. On the other hand, at the time of shooting or when a taken image is viewed at the time of setting a shooting mode, the lens unit 2 projects out parallel to the direction of the optical axis of the taking lens and is extended to such a position as to enable shooting.

A lens barrier 3 covers a surface of the taking lens when the lens unit 2 is retracted. The lens barrier 3 is constructed on a subject side, which is situated on a front side of the taking lens, and at the time of shooting, the lens barrier 3 retracts from a front surface of the taking lens so as not to narrow a shooting range.

A light-emitting device 4 (FIG. 1A) such as a flash, which is provided in a front upper part of the camera man body 1, is used, for example, when a subject is not satisfactorily bright at the time of shooting. A display unit 5 (FIG. 1B) provided on a back side of the camera main body 1 is used by a user at the time of shooting so as to ascertain whether or not a shooting range is a desired one. The display unit 5 is also used in viewing a taken image after shooting. The display unit 5 is mounted on the camera main body 1 via a rotary hinge 6, which has two axes perpendicular to each other, and is able to open, close, and rotate with respect to the camera main body 1. When the camera is carried, when the camera is not in use, or when only an operation to reproduce a taken image is performed, the display unit 5 is fixed in a retracted position with respect to the camera main body 1. At the time of shooting, the user opens, closes, or rotates the display unit 5 at a desired angle using the axes of the rotary hinge 6 as rotation axes.

When the camera is carried or is not in use, a display surface of the display unit 5 is caused to face the camera main body 1 and fixed in the retracted position, so that the display surface which is easily scratched can be protected. Also, a cable or a flexible substrate, not shown, for use in exchanging signals for displaying images between the display unit 5 and a circuit substrate runs through the rotary hinge 6.

A release button 7, which is operated at the start of shooting, is provided in an upper part of the camera main body 1. The release button 7 is configured to be depressed in two stages, that is, depressed halfway and depressed all the way down. When the release button 7 is depressed halfway, AF and AE are locked, and when the release button 7 is depressed all the way down, a taken image is captured.

A power button 8 for the camera is provided in an upper part of the camera main body 1. When the power button 8 is depressed, power supply to the camera is turned on, and at the time of setting a shooting mode, the lens barrier 3 retracts from the front surface of the taking lens, and the lens unit 2 is extended parallel to the direction of the optical axis of the taking lens to a predetermined position so that the camera can be ready to shoot. In a reproduction mode, the lens unit 2 is held in a retracted state, and a taken image is displayed on the display unit 5. A grip portion 9 provided on a side of the camera main body 1 is disposed such that the release button 7 can be easily operated with the grip portion 9 being gripped by the right hand.

Figure 2:
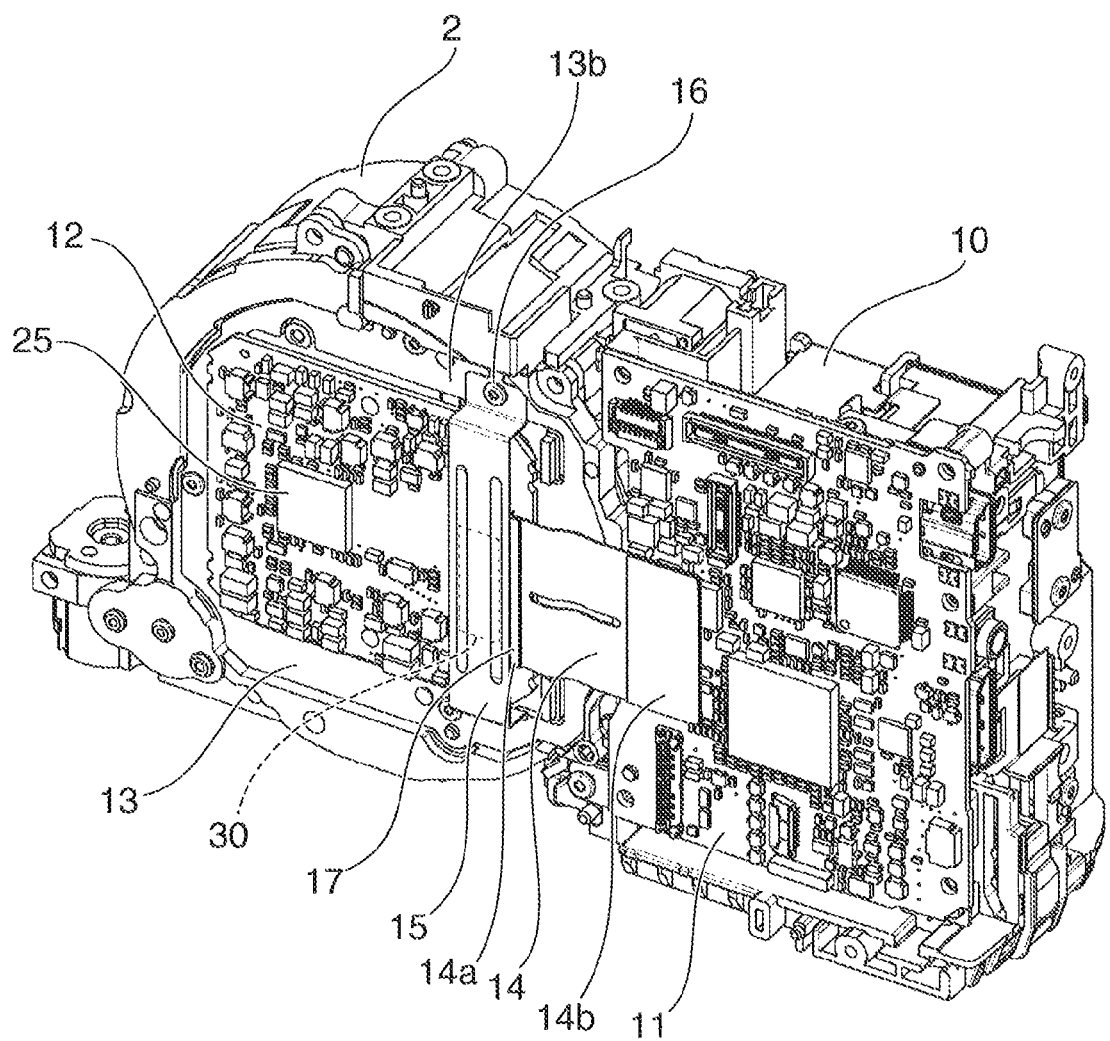
FIG. 2 is a rear perspective view showing the camera according to the first embodiment with an outer cover thereof removed.

FIG. 2 is a rear perspective view of the camera with an outer cover thereof removed.

A battery housing portion 10 for housing a battery which serves as a power source is a large constituent as with the lens unit 2. Accordingly, in many cases, the battery housing unit 10 is provided in an area close to the grip portion 9 as viewed in a horizontal direction of the camera so that the lens unit 2 can be disposed at a location away from the grip portion 9 with which the user holds the camera main body 1. A main substrate 11, which is an electronic circuit substrate, is disposed on a back side of the battery housing portion 10. The main substrate 11 is equipped with an IC (not shown), which controls a system of the camera, and connected to other circuit substrates via connectors or the like.

An image pickup substrate 12, which is a circuit substrate, is disposed on a back side of the lens unit 2. An image pickup device 18 (see FIG. 3A) is mounted on a subject side of the image pickup substrate 12. Light having passed through the taking lens of the lens unit 2 forms an image on a light-receiving surface of the image pickup device 18 and is subjected to photoelectric conversion and successively read out as image signals. A plurality of electronic components including an electronic component 25 are mounted on a back side of the image pickup substrate 12.

As will be described later with reference to FIGS. 3A and 3B, a fixing member 13 is fixed to the image pickup device 18 by bonding or the like. The position of the fixing member 13 is adjustable with respect to the lens unit 2 so as to enable adjustment of face inclination as optical adjustment in which the light-receiving surface of the image pickup device 18 is made vertical to the optical axis of the taking lens and the position of the image pickup device 18 is adjusted to a desired position.

The image pickup substrate 12 and the main substrate 11 are connected together by a flexible substrate 14, which is a connecting member, so that electric signals can be sent to and received from each other. The flexible substrate 14 is electrically and physically connected to the main substrate 11 and connected to the image pickup substrate 12 using a connector connecting method. One end 14a of the flexible substrate 14 is connected to the image pickup substrate 12 via a connector connecting portion 30. The other end 14b of the flexible substrate 14 is connected to the main substrate 11 by a connector.

Because the image pickup substrate 12 and the main substrate 11 are thus connected together by the flexible substrate 14, an adjustment margin can be absorbed by deflection of the flexible substrate 14 when face inclination of the fixing member 13 is adjusted after the main substrate 11 is fixed. As a result, face inclination of the image pickup device 18 can be properly adjusted.

Figure 3A:
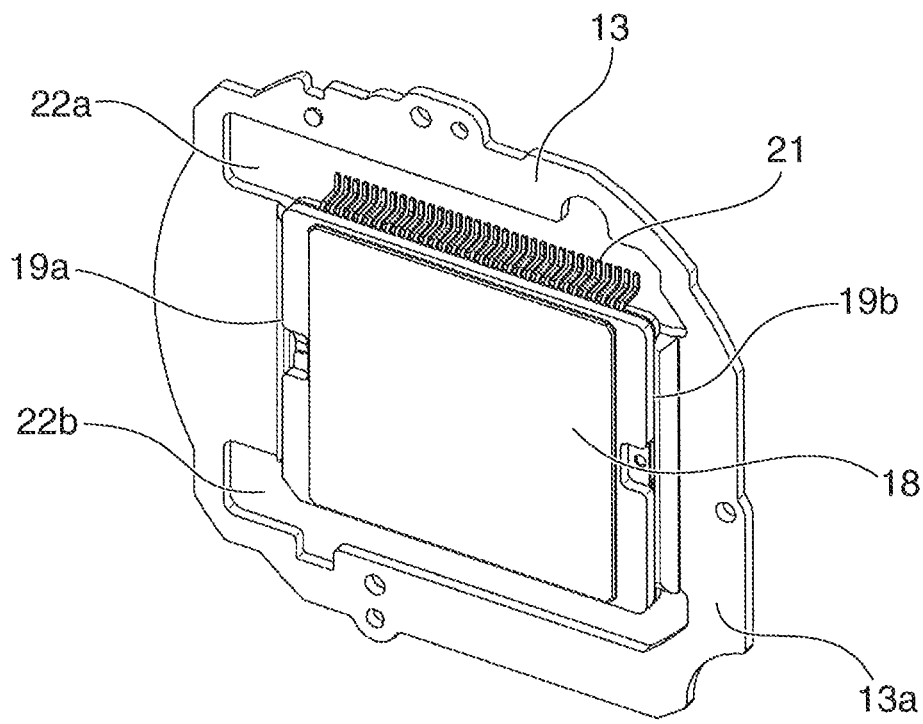
Figure 3B:
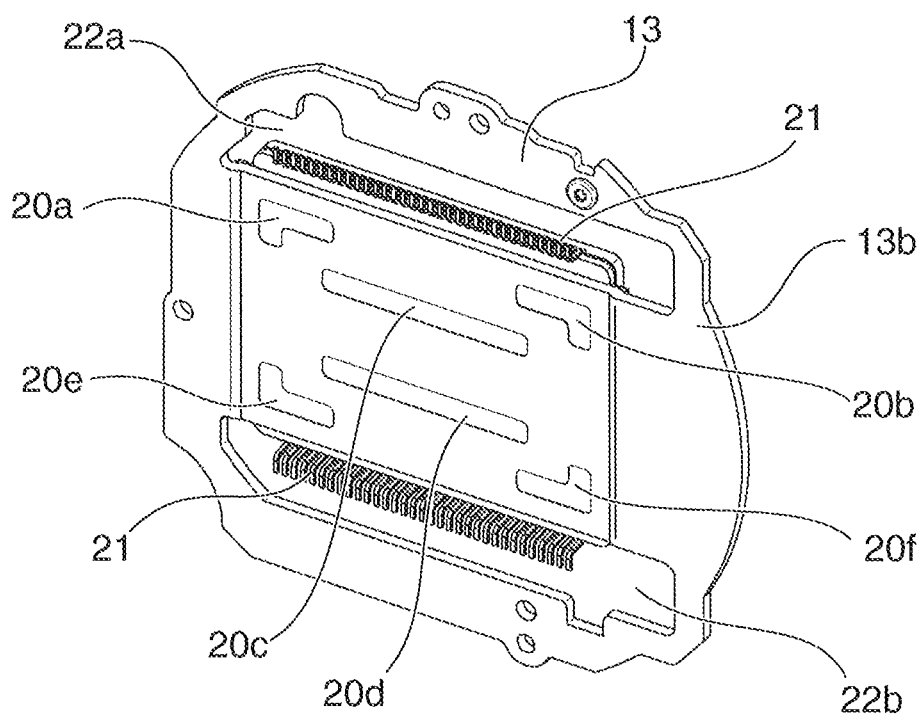

FIGS. 3A and 3B are a front perspective view and a rear perspective view, respectively, showing an area where the image pickup device 18 and the fixing member 13 are fixed together.

The image pickup device 18 is disposed on a front surface 13a side of the fixing member 13. After the image pickup device 18 is disposed on the fixing member 13, an adhesive agent is coated on side portions 19a and 19b of the image pickup device 18 which are in abutment on the fixing member 13. As a result, the image pickup device 18 is bonded and fixed to the fixing member 13 (see FIG. 3A). Further, by pouring an adhesive agent into adhesion holes 20a to 20f formed in the fixing member 13, a back side of the image pickup device 18 is bonded and fixed to the fixing member 13 (see FIG. 3B). The adhesive agent adopted here is preferably a UV adhesive agent in consideration of curing time, strength, and so on.

Then, with the image pickup device 18 being fixed on the fixing member 13, a terminal portion 21 of the image pickup device 18 is soldered to the image pickup substrate 12. Cutaway portions 22a and 22b are provided in the fixing member 13 so that a soldering iron can reach the terminal portion 21 during soldering.

Because the fixing member 13 can be brought into direct contact with the image pickup device 18, heat generated by the image pickup device 18 can be transmitted to the fixing member 13 and effectively diffused on the fixing member 13. Moreover, heat dissipation performance can be further improved by using a high thermal conductivity material such as copper for the fixing member 13.

As shown in FIG. 2, on a rear surface 13b side of the fixing member 13, a protective member 15 is disposed so as to cover the one end 14a of the flexible substrate 14 and the connector connecting portion 30 from behind. The protective member 15 is square U-shaped in side view and has upper and lower end thereof fastened to the fixing member 13 by screws 16 or the like. However, screws should not necessarily be used to fix the protective member 15.

Figure 4:
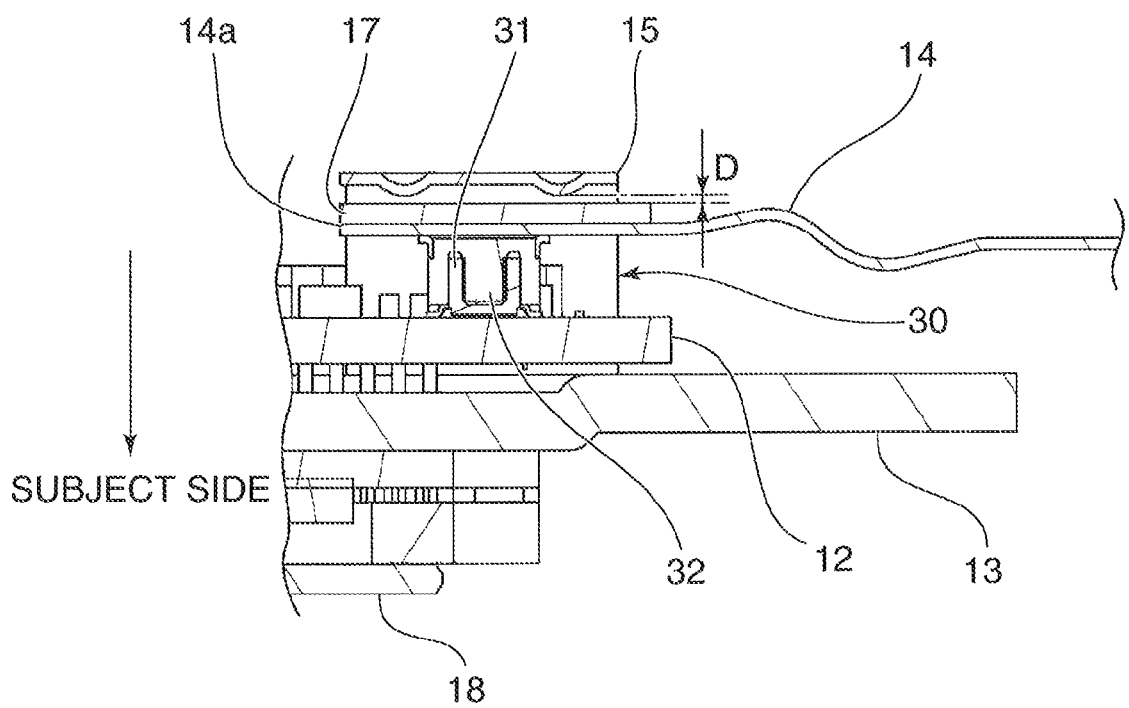
FIG. 4 is a horizontal cross-sectional view showing an area where a protective member according to the first embodiment is disposed as viewed from below.

FIG. 4 is a horizontal cross-sectional view showing an area where the protective member 15 is disposed as viewed from below.

As shown in FIG. 4, the connector connecting portion 30 is comprised of a connector 31 on the image pickup substrate 12 side and a connector 32 on the flexible substrate 14 side. This pair of connectors 31 and 32 is configured to vertically fit into each other, and they are inserted and extracted in a direction of the thickness of the image pickup substrate 12. Thus, the connector 32 is extracted rearward (on a side opposite to the subject side).

The one end 14a of the flexible substrate 14 has a reinforcing plate 17. The reinforcing plate 17 is mounted on a side (back side) opposite to the side where the connector 32 is disposed. Two projecting portions which project on the subject side are formed in the protective member 15 (see FIG. 2 as well), and a gap D is provided between these projecting portions and the reinforcing plate 17 in the direction of the thickness of the image pickup substrate 12. It should be noted that the projecting portions should not necessarily be formed in the protective member 15, and the gap D is the shortest distance between the protective member 15 and the one end 14a (the reinforcing plate 17 in the case where the one end 14a is provided with the reinforcing plate 17) in the direction of the thickness of the image pickup substrate 12.

Because the connector connecting portion 30 is of the vertically fitting type, disconnection of the connector connecting portion 30 can be prevented by the protective member 15 covering the connector connecting portion 30 in the direction in which the connector 32 is extracted. The value of the gap D is set at a value smaller than an effective fitting length of (the connector 31 and the connector 32 of) the connector connecting portion 30. As a result, stress on a soldered portion of the connector connecting portion 30 mounted on a substrate can be prevented while the function of preventing disconnection of the connector connecting portion 30 can be secured.

As described above, because the protective member 15 is fixed to the fixing member 13, heat of the image pickup device 18 is transmitted to the protective member 15 as well via the fixing member 13. Therefore, by adopting a high thermal conductivity material for the protective member 15, the protective member 15 can also be used for heat dissipation of the image pickup device 18.

During optical adjustment, positions of the image pickup device 18, the image pickup substrate 12, the fixing member 13, and the protective member 15 are adjusted after they are integrated with each other.

According to the present embodiment, because the protective member 15 covering the connector connecting portion 30 is fixed to the fixing member 13 fixed to the image pickup device 18, disconnection of the connector 31 and the connector 32 can be prevented without making optical adjustment difficult. Because the protective member 15 has a simple construction, the use of the protective member 15 contributes to downsizing of the image pickup substrate 12, on which the image pickup device 18 is mounted, and cost reduction.

Moreover, the gap D shorter than the effective fitting length of the connector connecting portion 30 is provided between (the reinforcing plate 17 of) the one end 14a of the flexible substrate 14 and the protective member 15. As a result, disconnection of the connector connecting portion 30 can be prevented while stress on the soldered portion of the connector connecting portion 30 can be avoided.

It should be noted that from the viewpoint of preventing disconnection of the connector connecting portion 30, stress on the soldered portion can be controlled by the following method: no gap is provided between the protective member 15 and the reinforcing plate 17, the protective member 15 is made of an elastic deformable material such as a synthetic resin, and the protective member 15 presses down the reinforcing plate 17.

Alternatively, an elastic member such as a rubber or a sponge may be disposed between the protective member 15 and the reinforcing plate 17. Namely, the elastic member is stacked on a surface of the protective member 15 that faces the reinforcing plate 17 or on a surface of the reinforcing plate 17 that faces the protective member 15. This will urge the connector connecting portion 30 with the right amount of urging force, and disconnection of the connector connecting portion 30 can be prevented in such a range as not to overstress the soldered portion. It should be noted that this elastic member may be integral with the protective member 15 or the reinforcing plate 17.

Figure 5A:
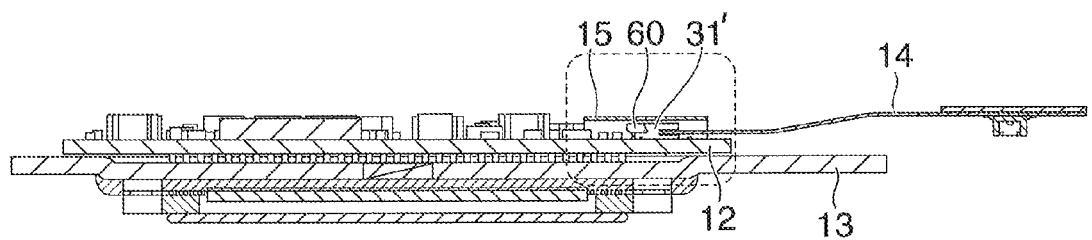
Figure 5B:
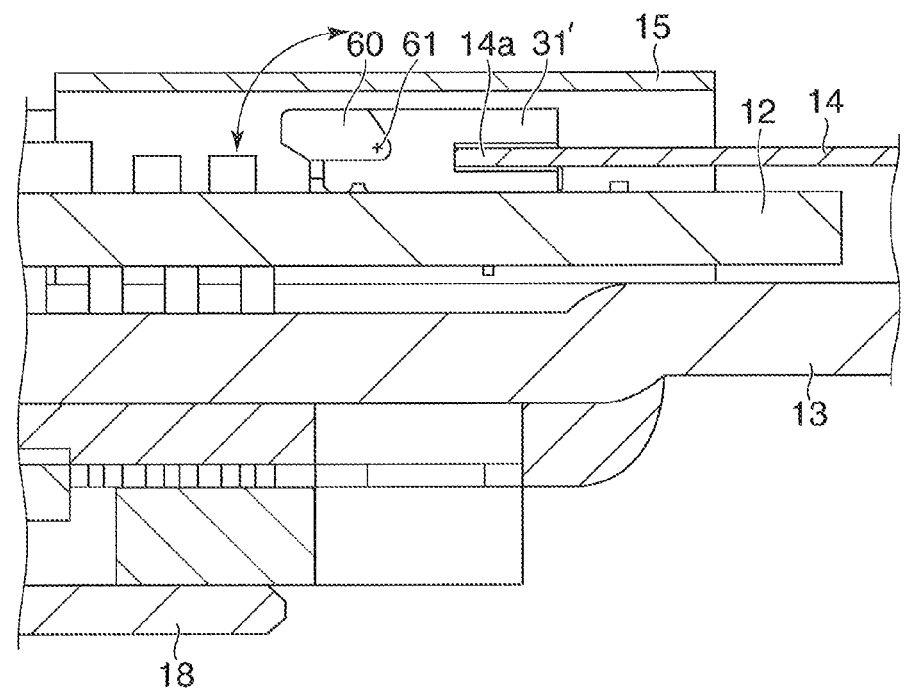

It should be noted that the type of the connector connecting portion 30 is not limited to the vertical fitting type described above. For example, a flip-type connector 31' as shown in FIGS. 5A and 5B can be used. FIG. 5B is an enlarged view showing a portion enclosed with a broken line in FIG. 5A. The flip-type connector 31' has a flip member (operating member) 60 which is rotated with respect to a connector main body. In a case where the flip-type connector 31' is used, a connector connecting terminal portion (not shown) is formed at the one end 14a of the flexible substrate 14. The connector connecting terminal portion of the one end 14a is inserted into the connector 31' while pulling the flip member 60 up, and then, the flip member 60 is pressed down after inserting the one end 14a into the connector 31'. At that time, the flip member 60 rotates about a rotation axis 61. As shown in FIG. 5B, the one end 14a inserted in to the connector 31' caught by the pressed flip member 60 while preventing from disconnection. Moreover, as shown in FIG. 5B, in a state where the protective member 15 is attached to the fixing member 13, the protective member 15 covers the flip member 60. As a result, the flip member 60 is prohibited to be rotated, and hence, the flip member 60 can be kept pressed down. Therefore, the connector connecting terminal portion is fixed so as not to be disconnected from the connector 31'. As also shown in FIG. 5B, a gap is provided between the protective member 15 and the pressed flip member 60. However, even when the flip member 60 is pulled up until the travel distance of the flip member 60 becomes the same as the gap, the connector connecting terminal portion is still caught so as not to be disconnected from the connector 31'. Alternatively, the flip member 60 may be pressed by an elastic member such as a rubber and a sponge so that the flip member 60 is not pulled up.

It should be noted that the fixing member 13 has only to be fixed to at least one of the image pickup device 18 and the image pickup substrate 12.

Although in the first embodiment, it is assumed that the flexible substrate 14 is used as an exemplary connecting member, the same effects can be obtained by using a wire harness electrically and physically connected to the main substrate 11 and the image pickup substrate 12 using a connector connecting method.

Figure 6A:
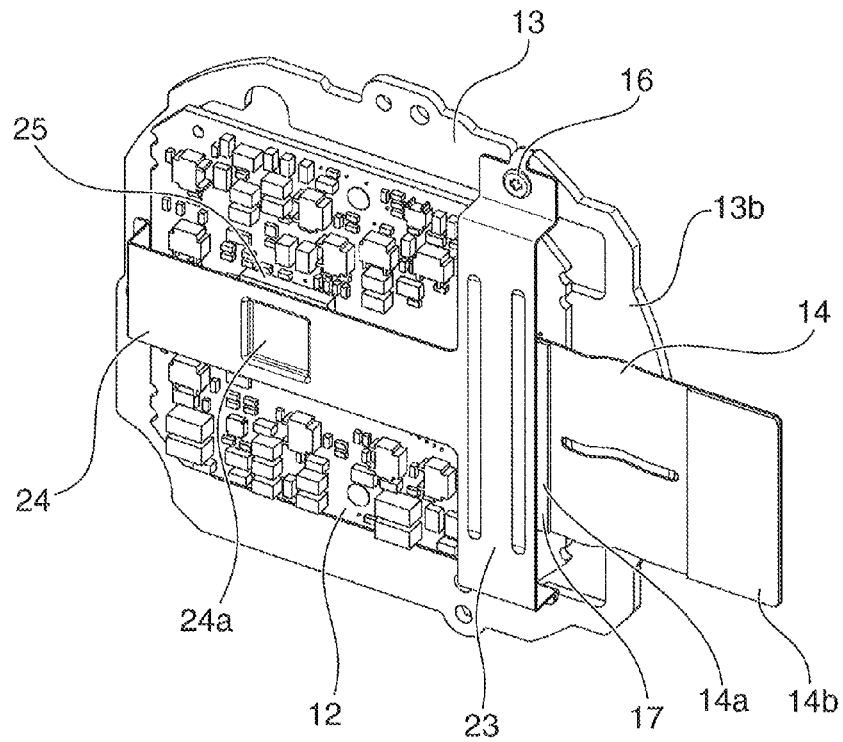
Figure 6B:
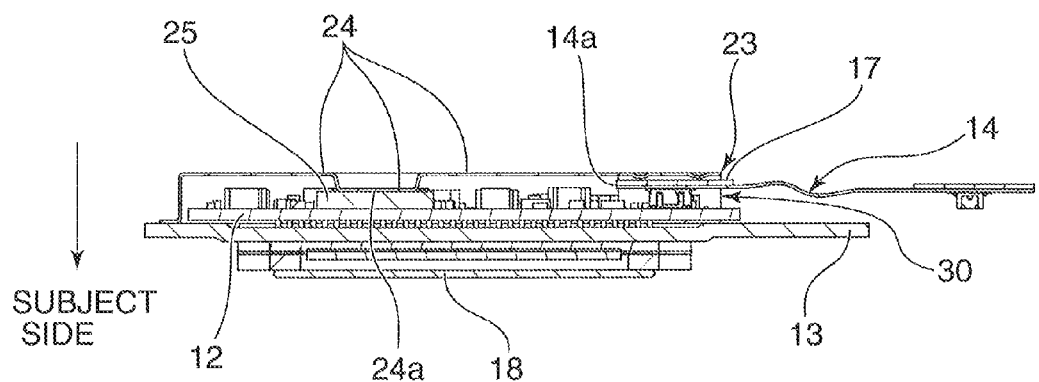

FIGS. 6A and 6B are a rear perspective view and a horizontal cross-sectional view, respectively, showing an area where a fixing member and a protective member are fixed together in an image pickup apparatus according to a second embodiment of the present invention.

The second embodiment differs from the first embodiment in that a protective member 23 is provided in place of the protective member 15, and otherwise they are identical. It is assumed that an electronic component 25 among electronic components disposed on the back side of the image pickup substrate 12 is an electronic component that generates an especially large amount of heat.

The protective member 23 has an arm portion 24 extended in a direction (leftward) opposite to the direction in which the flexible substrate 14 is extended as viewed from the one end 14a of the flexible substrate 14, and the protective member 23 and the arm portion 24 are configured as a T-shaped integral unit in rear view. As shown in FIG. 6B, a vertical portion of the protective member 23 which covers the connector connecting portion 30 is identical in construction to the protective member 15 according to the first embodiment, and the vertical portion is fixed to the fixing member 13. Also, an end of the arm portion 24 of the protective member 23 is fastened to the fixing member 13 by a screw, not shown.

A contact portion 24a that projects out forward is formed part way along the arm portion 24. The contact portion 24a is thermally connected to the electronic component 25 mounted on the image pickup substrate 12. The form of thermal connection may be a form in which the protective member 23 and the electronic component 25 are in direct contact with each other, or a form in which a high thermal conductivity member which is elastic is interposed between the protective member 23 and the electronic component 25.

According to the second embodiment, the same effects as those in the first embodiment can be obtained as for the effect of preventing disconnection of the connector connecting portion 30 without stressing the soldered portion of the connector connecting portion 30. Besides that, because the protective member 23 and the electronic component 25 are thermally connected together, heat generated by the image pickup substrate 12, in particular, heat generated by the electronic component 25 that is a heat-generating component can be effectively diffused using a simple construction.

In the first and second embodiments described above, the step in which the terminal portion 21 of the image pickup device 18 is connected to the image pickup substrate 12 with the image pickup device 18 being fixed to the fixing member 13 is adopted. Alternatively, as in a variation shown in FIG. 7, the image pickup device 18 may be fixed to the fixing member 13 in a state in which the image pickup device 18 has been mounted on the image pickup substrate 12 in advance.

Figure 7:
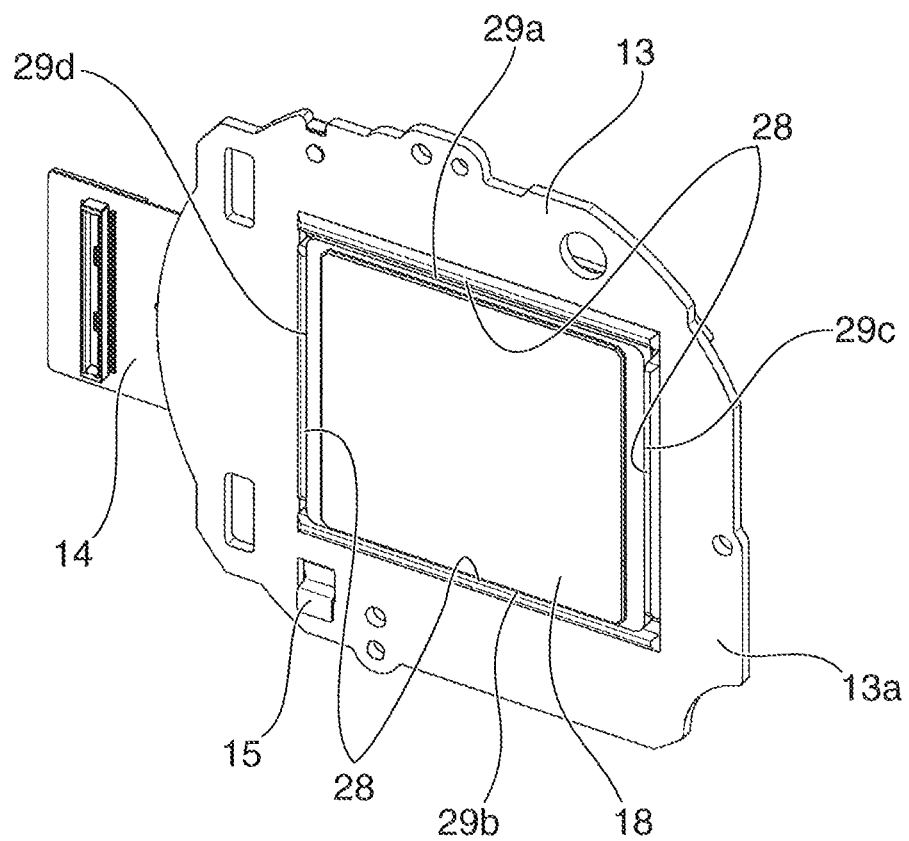
FIG. 7 is a front perspective view showing an area where the image pickup device and the fixing member are fixed together using a fixing technique according to a variation.

FIG. 7 is a front perspective view showing an area where the image pickup device 18 and the fixing member 13 are fixed together using a fixing technique according to the variation.

The image pickup device 18 is soldered to the image pickup substrate 12 in a reflow mounting process in advance. A rectangular opening 28 larger than an outside shape of the image pickup device 18 is formed in the fixing member 13. The image pickup device 18 is disposed so as to be located inside the opening 28, and an adhesive agent is poured into a gap between a side of the image pickup device 18 and an end face of the opening 28. As a result, the image pickup device 18 is bonded and fixed to the fixing member 13 in a plurality of upper, lower, right, and left adhesion places 29a to 29d. Preferably, the image pickup device 18 and the fixing member 13 are bonded together on at least two sides of the outside shape of the image pickup device 18, and more preferably, the image pickup substrate 12 is also fixed to the fixing member 13 at the same time. Because bonding on a rear surface of the image pickup device 18 is difficult, it is necessary to take bonding strength into consideration. Because the image pickup device 18 can be soldered to the image pickup substrate 12 in a reflow mounting process in advance, and it is thus not necessary to use a soldering iron, no portions equivalent to the cutaway portions 22a and 22b (see FIGS. 3A and 3B) are provided in the fixing member 13.

Referring next to FIGS. 8 to 10C, a description will be given of a third embodiment of the present invention.

Figure 8:
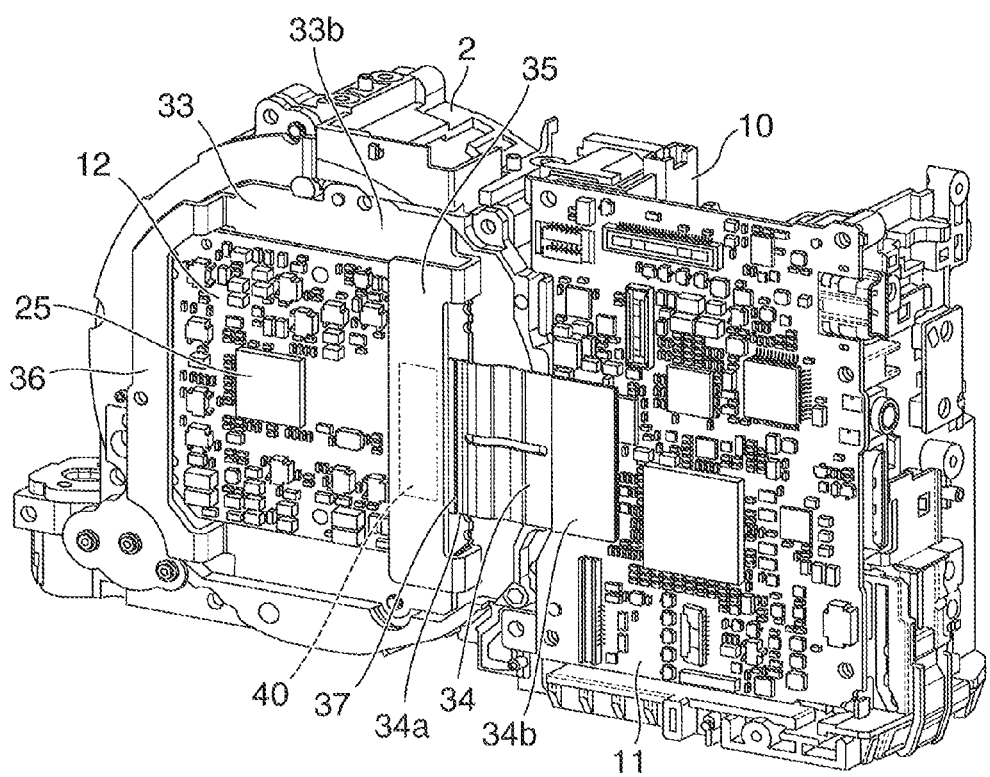
FIG. 8 is a rear perspective view showing an image pickup apparatus according to a third embodiment with an outer cover thereof removed.

FIG. 8 is a rear perspective view showing an image pickup apparatus according to the third embodiment with an outer cover thereof removed.

The third embodiment differs from the first embodiment in that a protective member and a fixing member are configured as an integral unit. Namely, the differences between the third embodiment and the first embodiment are that a restraining portion 35 and a bent portion 36, which are equivalent to a protective member, are provided in a fixing member 33 (see FIG. 9B), and a ground layer 44 is provided between the fixing member 33 and a flexible substrate 34 (see FIG. 10C). It should be noted that elements corresponding to those in the first embodiment are designated by the same reference symbols in the figure.

As shown in FIG. 8, the restraining portion 35 is formed integrally with the fixing member 33 so as to cover a connector connecting portion 40 that connects the image pickup substrate 12 and the flexible substrate 34. The restraining portion 35 is extended from one end of the fixing member 33, and is bent so as to face a rear surface 33b of the fixing member 33. In the third embodiment, when a joined unit constructed by joining the image pickup substrate 12 and the flexible substrate 34 is mounted on the fixing member 33, a surface for exposing the image pickup substrate 12 is referred to as a front surface 33a (See, FIGS. 9A, 9C and 9E) of the fixing member 33 and a surface for exposing the electronic component 25 is referred to as the rear surface 33b.

Figure 9A:
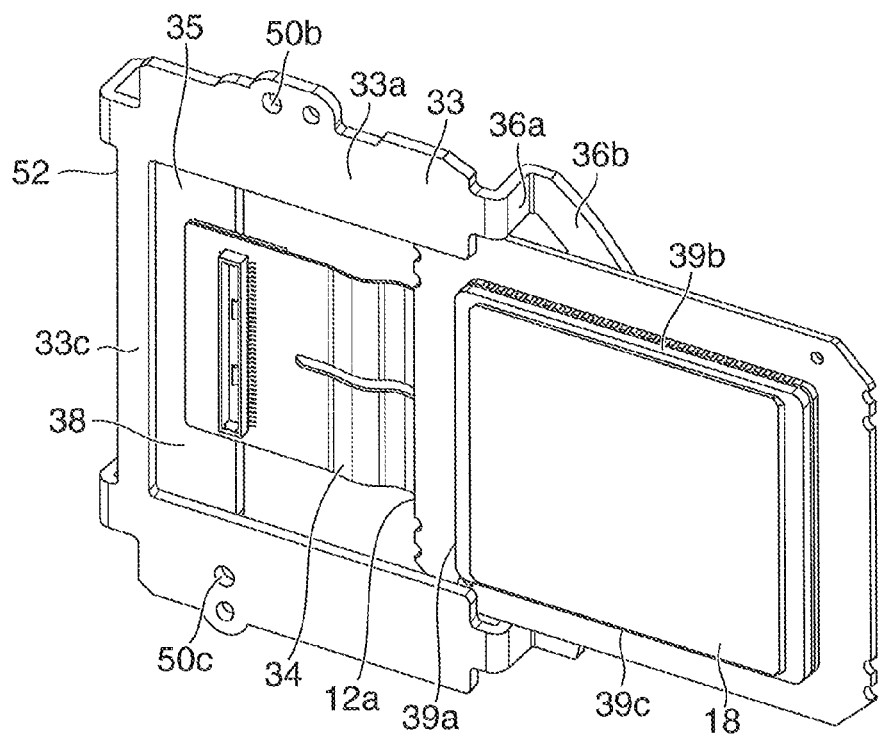
Figure 9B:
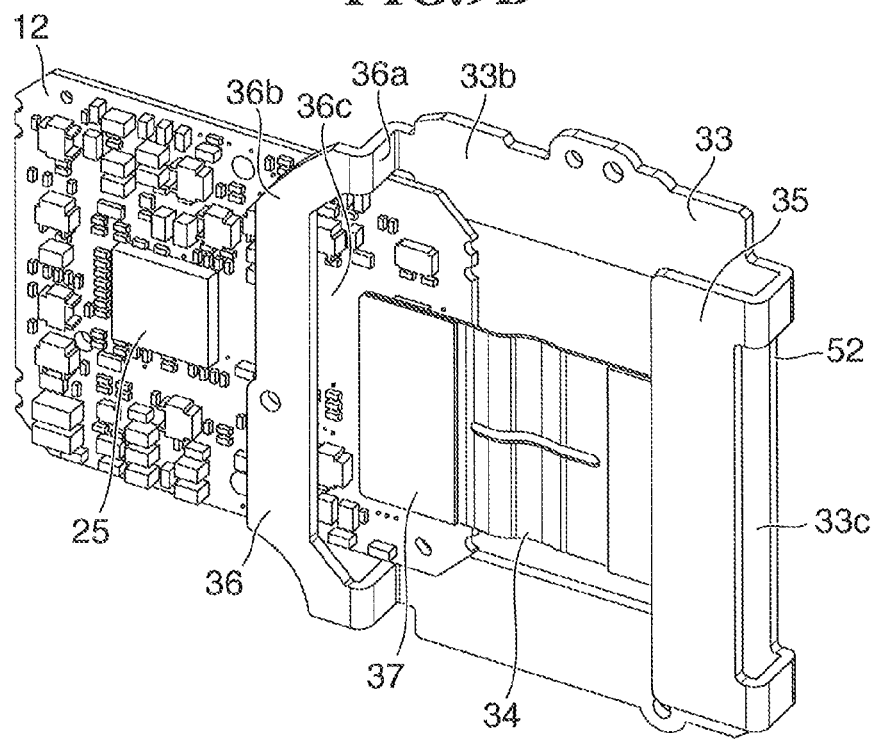

As shown in FIG. 8, the fixing member 33 and the bent portion 36 are formed integrally. The bent portion 36 is formed on a side opposite to a side in which the restraining portion 35 is formed. The bent portion 36 is bent in a crank shape so as to project out from the rear surface 33b of the fixing member 33 in a rear direction.—As shown in FIGS. 9A and 9B, the bent portion 36 is comprised of a projecting portion 36a that projects out from the rear surface 33b of the fixing member 33 in the rear direction, and an extending portion 36b that extends outwardly from the projecting portion 36a. The extending portion 36b extends substantially parallel to the rear surface 33b of the fixing member 33. An opening 36c is formed in the projecting portion 36a. As shown in FIGS. 9A to 9F, a joined unit constructed by joining of the image pickup substrate 12 and the flexible substrate 34 is passed through the opening 36c and mounted on the fixing member 33. In this case, an amount of projection of the projecting portion 36a is determined in such a manner that the electronic component 25 mounted on the image pickup substrate 12 does not interfere with the extending portion 36b.

Moreover, a hole portion 52 is formed in the restraining portion 35 of the fixing member 33. The flexible substrate 34 is inserted through the hole portion 52 when the joined unit constructed by joining the image pickup substrate 12 and the flexible substrate 34 is mounted on the fixing member 33.

Figure 9C:
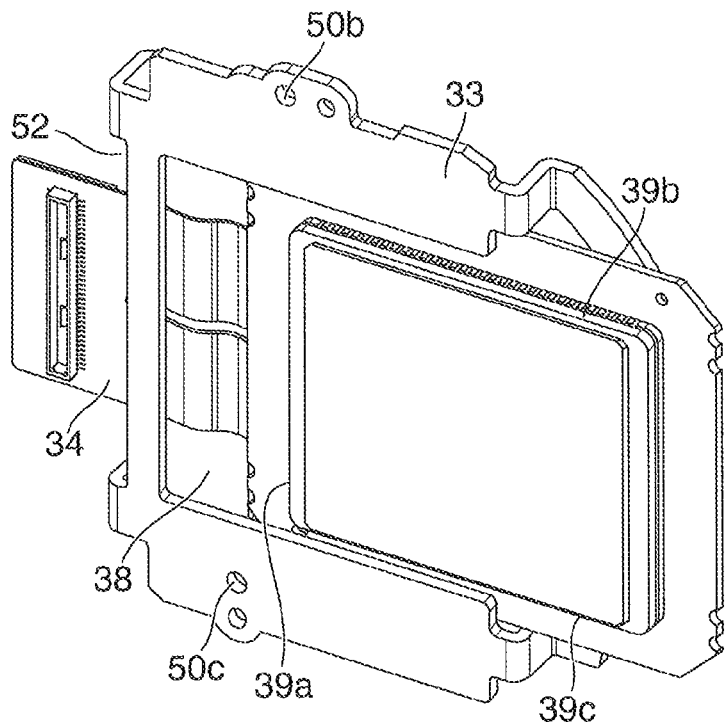
Figure 9D:
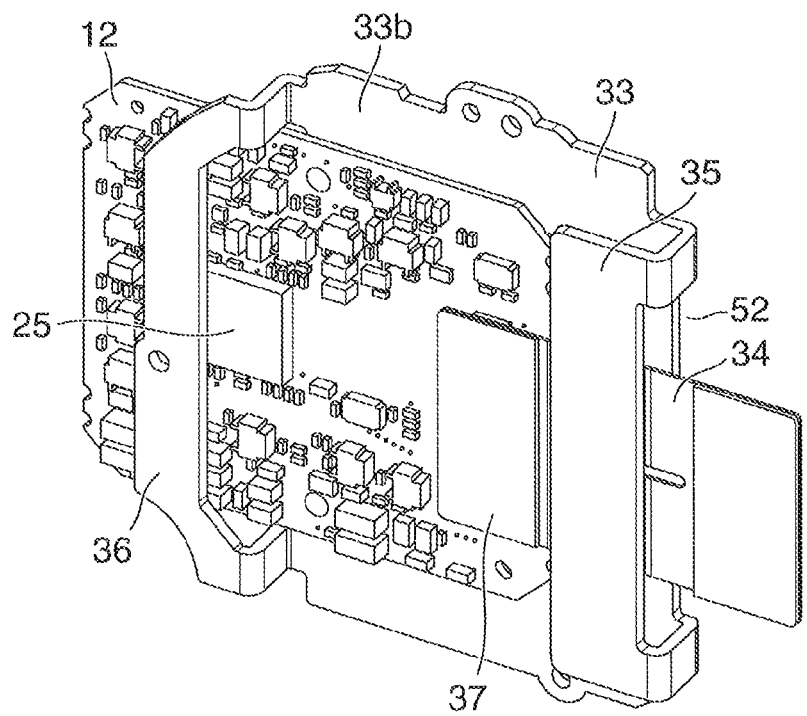
Figure 9E:
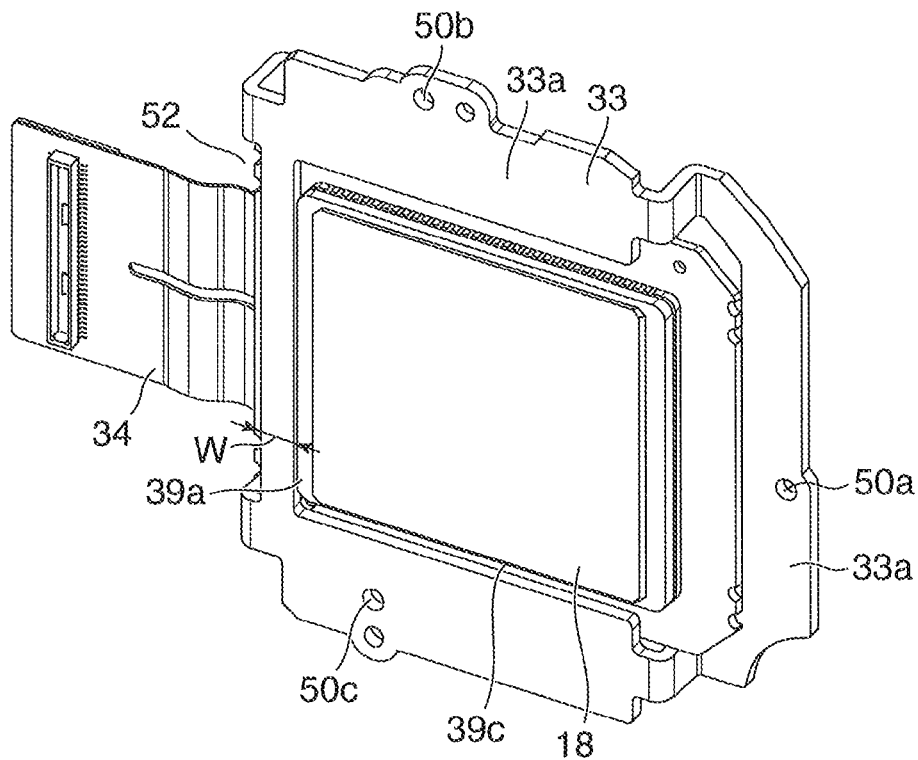
Figure 9F:
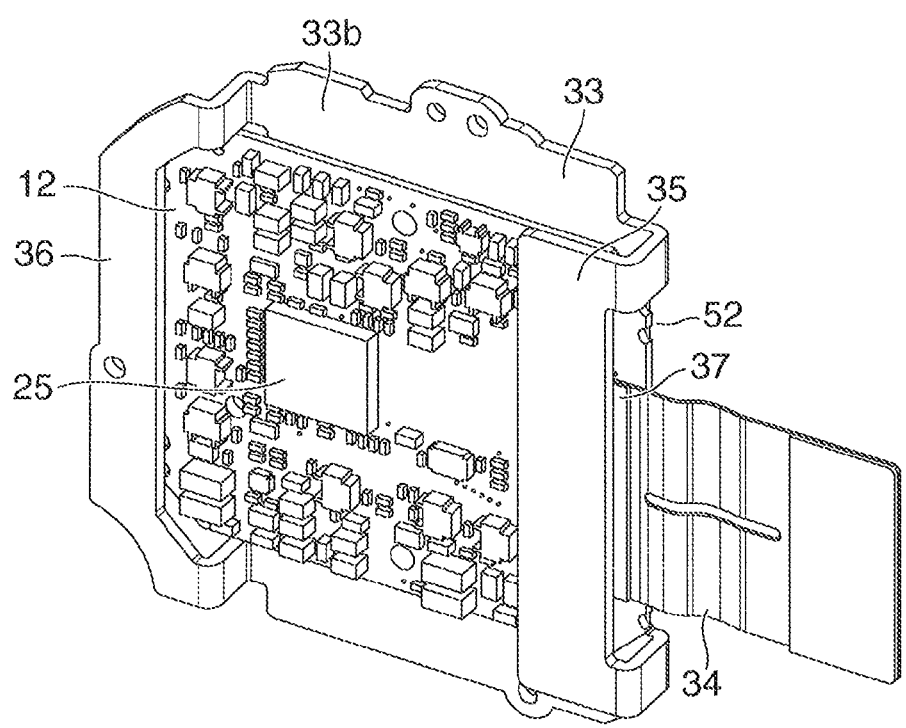

FIGS. 9A to 9F are views showing a states in which the joined unit constructed by joining the image pickup substrate 12 and the flexible substrate 34 is mounted on the fixing member 33 according to the third embodiment. FIGS. 9A, 9C, and 9E are front perspective views showing how the joined unit of the image pickup substrate 12 and the flexible substrate 34 is inserted into the fixing member 33. FIGS. 9B, 9D, and 9F are rear perspective views showing how the joined unit of the image pickup substrate 12 and the flexible substrate 34 is inserted into the fixing member 33.

First, the image pickup substrate 12 on which the image pickup device 18 is mounted, and the flexible substrate 34 are connected together via the connector connecting portion 40 to construct a joined unit (hereafter referred to merely as "the joined unit"). Then, the joined unit is mounted on the fixing member 33.

The joined unit is inserted into the fixing member 33 from the right as viewed in FIGS. 9A, 9C, and 9E (the left as viewed in FIGS. 9B, 9D, and 9F), and at a predetermined position, bonded and fixed to the fixing member 33 in a plurality of bonding places 39a and 39c, to be described later.

A rectangular opening 38 larger than an outside shape of the image pickup device 18 is formed in the fixing member 33. The image pickup device 18 is disposed so as to be positioned inside the opening 38 when the joined unit is bonded and fixed to the fixing member 33, and an adhesive agent is poured into gaps between a side of the image pickup device 18 and an end face of the opening 38. As a result, the image pickup device 18 is bonded and fixed to the fixing member 33 in a plurality of bonding places 39a to 39c. Moreover, the fixing member 33 is fixed not only to the image pickup device 18 but also to the image pickup substrate 12, and as a result, the fixing member 33, the image pickup device 18, and the image pickup substrate 12 are integrated.

Further, an elastic member such as a coil spring (not shown) is disposed between the lens unit 2 and the fixing member 33, screws are inserted into holes 50a to 50c of the fixing member 33, and the amount of screwing into the lens unit 2 by each screw is adjusted. As a result, the position of the image pickup device 18 relative to the lens unit 2 can be adjusted in a simple manner, and accordingly, face inclination adjustment that adjusts the image pickup device 18 to a desired position can be performed.

It should be noted that a UV adhesive agent is preferably used as an adhesive agent for use in bonding the image pickup device 18 and the fixing member 33 together in consideration of hardening time, strength, and so on.

Moreover, because the fixing member 33 can be brought into direct contact with the image pickup device 18 by fixing the fixing member 33 to the image pickup device 18, heat generated by the image pickup device 18 can be transmitted to the fixing member 33 and effectively diffused on the fixing member 33. Further, heat dissipation performance can be further enhanced by using a high thermal conductivity material such as copper for the fixing member 33.

Figure 10A:
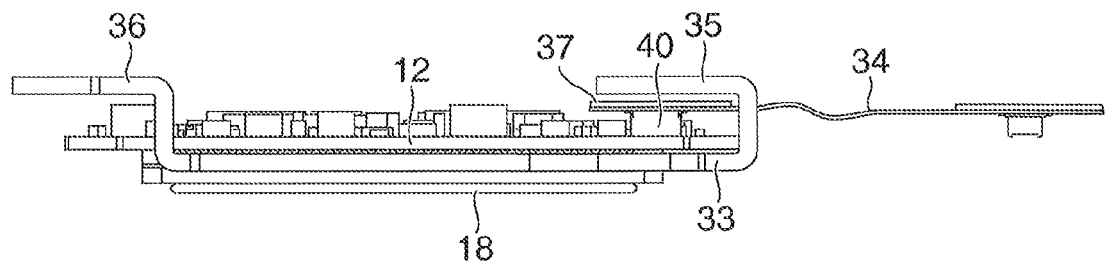
Figure 10B:
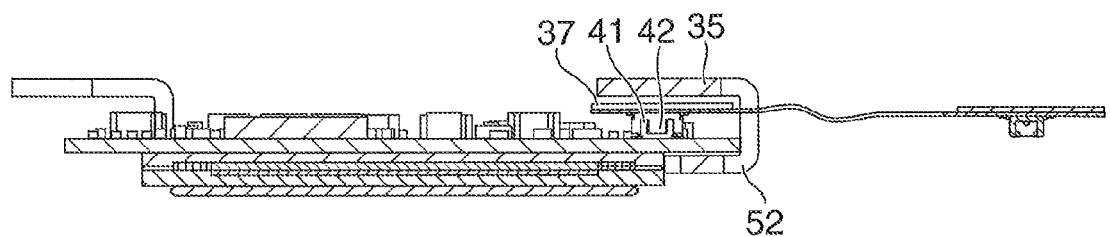
Figure 10C:
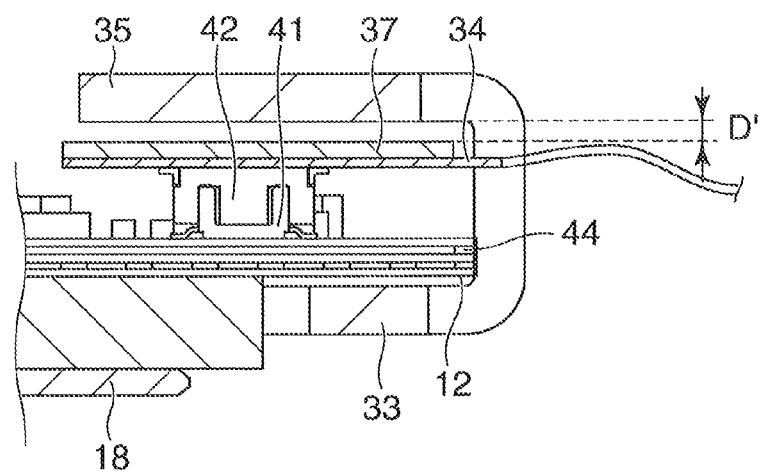

FIGS. 10A to 10C are views showing how the image pickup device 18 and the image pickup substrate 12 and the fixing member 33 according to the third embodiment are fixed together, in which FIG. 10A is a side view, FIG. 10B is a horizontal cross-sectional view, and FIG. 10C is an enlarged horizontal cross-sectional view showing connectors and their vicinity.

As shown in FIGS. 10A to 10C, the image pickup substrate 12 is interposed between the fixing member 33 and the flexible substrate 34. The connector connecting portion 40 that connects the image pickup substrate 12 and the flexible substrate 34 together is covered with the restraining portion 35. A reinforcing plate 37 provided at one end 34a of the flexible substrate 34 is interposed between the restraining portion 35 and the flexible substrate 34.

The connector connecting portion 40 is comprised of a connector 41 on the image pickup substrate 12 side and a connector 42 on the flexible substrate 34 side, and connects the image pickup substrate 12 and the flexible substrate 34 together. This pair of connectors 41 and 42 is configured to vertically fit into each other, and they are inserted and extracted in the direction of the thickness of the image pickup substrate 12. Thus, the connector 42 is extracted rearward (on a side opposite to the subject side, i.e. upward as viewed in the figure).

Because the connector connecting portion 40 is of the vertically fitting type, disconnection of the connector connecting portion 40 can be prevented by the restraining portion 35 covering the connector connecting portion 40 in the direction in which the connector 42 is extracted.

The reinforcing plate 37 is provided at the one end 34a of the flexible substrate 34. The reinforcing plate 37 is mounted on a side (back side) of the flexible substrate 34 which is opposite to the side where the connector 42 is disposed. A gap D' is provided between the restraining portion 35 and the reinforcing plate 37 in the direction of the thickness of the image pickup substrate 12. Alternatively, the gap D' may be a gap between the restraining portion 35 and the flexible substrate 34.

The value of the gap D' is set at a value smaller than an effective fitting length of (the connector 41 and the connector 42 of) the connector connecting portion 40. As a result, the function of preventing disconnection of the connector connecting portion 40 can be secured.

An elastic member may be disposed between the restraining portion 35 and the reinforcing plate 37. This will make it possible to press down the reinforcing plate 37 by a holding force not more than a predetermined amount and control stress placed on a soldered portion for mounting the connector connecting portion 40 on a substrate.

It should be noted that the connector connecting portion 40 is not limited to the vertical fitting type described above. For example, as with the one in first embodiment shown in FIGS. 5A and 5B, the flip-type connector 31' can be used. In this case, as shown in FIGS. 9E and 9F, the restraining portion 35 covers the flip member 60 after the joined unit is mounted on the fixing member 33. As a result, the flip member 60 is prohibited to be rotated, and hence, the flip member 60 can be kept pressed down. Therefore, the connector connecting terminal portion is fixed so as not to be disconnected from the connector 31'. At that time, a gap is provided between the restraining portion 15 and the pressed flip member 60. However, even when the flip member 60 is pulled up until the travel distance of the flip member 60 becomes the same as the gap, the connector connecting terminal portion is still caught so as not to be disconnected from the connector 31'. Alternatively, the flip member 60 may be pressed by an elastic member such as a rubber and a sponge so that the flip member 60 is not pulled up.

As described above, the fixing member 33 is fixed to the lens unit 2 via screws, but the fixing member 33 is not directly grounded because the lens unit 2 is made of resin in many cases. As a result, electric noise that intrudes from the fixing member 33 into the flexible substrate 34 tends to be generated.

In the third embodiment, in order to prevent the intrusion of electric noise from the fixing member 33 into the flexible substrate 34, the ground layer 44 is provided in a wiring layer of the image pickup substrate 12 to act as a shield against the intrusion of electric noise from the fixing member 33 into the flexible substrate 34. The ground layer 44 is provided, in particular, in an area where the image pickup substrate 12 and the flexible substrate 34 face each other.

Further, in the third embodiment, a width W (FIG. 9E) of one side 33c of the fixing member 33 is set at such a value as to enable the image pickup substrate 12 to fully shield the connector connecting portion 40 from the side 33c so as to prevent the fixing member 33 and the flexible substrate 34 from directly facing each other when the joined unit is bonded and fixed to the fixing member 33.

It should be noted that metal or the like with high shielding ability may be used as the reinforcing plate 37. Moreover, an electromagnetic wave absorber (not shown) or the like may be provided on the reinforcing plate 37 to act as a shield against intrusion of electric noise from the restraining portion 35 into the connector connecting portion 40. In this case, a gap (not shown) between the electromagnetic wave absorber and the restraining portion 35 is set at a value not more than an effective fitting length of the connector connecting portion 40. The electromagnetic wave absorber may be provided in the restraining portion 35.

As described above, according to the third embodiment, because the fixing member 33 which is fixed to the image pickup device 18 is provided with the restraining portion 35, disconnection of the connector connecting portion 40 that connects the image pickup substrate 12 and the flexible substrate 34 together can be prevented in a simple manner without bringing about an increase in the number of components.

Moreover, because the image pickup substrate 12 is interposed between the flexible substrate 34 and the fixing member 33, and the ground layer 44 is provided in the wiring layer of the image pickup substrate 12, intrusion of electric noise from the fixing member 33 into the flexible substrate 34 can be prevented.

Further, because the restraining portion 35 and the bent portion 36 are projected in the same direction, their effects on the thickness of the digital camera main body 1 can be minimized.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2011-257454, filed Nov. 25, 2011, and No. 2012-249428, filed Nov. 13, 2012, which are hereby incorporated by reference herein in their entirety.

What is claimed is:

1. An image pickup apparatus comprising:
a lens unit;
an image pickup device;
a circuit substrate on which the image pickup device is mounted;
a fixing member directly fixed to the image pickup device;
a flexible substrate;
a first connector mounted on the circuit substrate;
a second connector mounted on the flexible substrate; and
a cover member fixed to the fixing member, wherein a position of the fixing member is adjustable with respect to the lens unit;

wherein in a case where the first connector is connected to the second connector and the cover member is fixed to the fixing member, a gap is provided between the cover member and the flexible substrate, and wherein the gap is smaller than a travel distance for disconnecting the second connector from the first connector.

2. The image pickup apparatus according to claim 1, wherein positions of the image pickup device, the circuit substrate, and the fixing member are adjustable integrally with respect to the lens unit.

3. The image pickup apparatus according to claim 1, wherein the first connector and the second connector are configured to be connected and disconnected in a direction of a thickness of the circuit substrate, and wherein the gap is smaller than an effective fitting length of the first connector and the second connector, in a direction in which the first connector and the second connector are disconnected.

4. The image pickup apparatus according to claim 1, wherein the first connector and the second connector are configured to be connected and disconnected in a direction of a thickness of the circuit substrate, and wherein an elastic member is disposed into the gap so as to prevent disconnection between the first connector and the second connector.

* * * * *